United States Patent
Endoh et al.

(10) Patent No.: US 9,418,275 B2
(45) Date of Patent: Aug. 16, 2016

(54) BIOMETRIC INFORMATION PROCESSING FOR PROVIDING INCREASED AUTHENTICATION PRECISION BY GUIDING A USER TO PLACE AUXILIARY INFORMATION WITHIN AN IMAGING RANGE

(71) Applicant: FUJITSU LIMITED, Kawasaki-shi, Kanagawa (JP)

(72) Inventors: Toshio Endoh, Yokohama (JP); Takashi Shinzaki, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 21 days.

(21) Appl. No.: 14/538,075

(22) Filed: Nov. 11, 2014

(65) Prior Publication Data

US 2015/0063664 A1 Mar. 5, 2015

Related U.S. Application Data

(63) Continuation of application No. PCT/JP2012/063095, filed on May 22, 2012.

(51) Int. Cl.
G06K 9/00 (2006.01)

(52) U.S. Cl.
CPC ........ G06K 9/00067 (2013.01); G06K 9/00013 (2013.01); G06K 9/00228 (2013.01); G06K 9/00892 (2013.01); G06K 9/00912 (2013.01)

(58) Field of Classification Search
None
See application file for complete search history.

(56) References Cited

U.S. PATENT DOCUMENTS

| 2005/0148876 A1 | 7/2005 | Endoh et al. |
| 2005/0281442 A1 | 12/2005 | Miura et al. |
| 2006/0080547 A1 | 4/2006 | Higashiura et al. |
| 2008/0063244 A1 | 3/2008 | Tanaka et al. |
| 2011/0243396 A1* | 10/2011 | Hama et al. ............ A61B 5/117 382/115 |

FOREIGN PATENT DOCUMENTS

| EP | 1 903 509 A1 | 3/2008 |
| EP | 2 105 865 A2 | 9/2009 |
| EP | 2 107 499 A1 | 10/2009 |
| JP | 8-241480 | 9/1996 |
| JP | 2002-83298 | 3/2002 |
| JP | 2003-67750 | 3/2003 |
| JP | WO2004/021884 | 3/2004 |

(Continued)

OTHER PUBLICATIONS

Patent Abstracts of Japan, Publication No. 08-241480, published Sep. 17, 1996.

(Continued)

*Primary Examiner* — Siamak Harandi
(74) *Attorney, Agent, or Firm* — Staas & Halsey LLP

(57) ABSTRACT

A biometric information processing apparatus includes a processor; and a memory, wherein the processor is configured to extract auxiliary information representing a part of a body being captured together with biometric information from a plurality of images captured by an imaging unit; to trace the auxiliary information in a time direction; to extract the biometric information from at least one image among the plurality of images; to associate the traced auxiliary information with the extracted biometric information in terms of a positional relationship; and to output the auxiliary information having been associated with the biometric information.

6 Claims, 18 Drawing Sheets

(56) References Cited

FOREIGN PATENT DOCUMENTS

| JP | 2004-102993 | 4/2004 |
|---|---|---|
| JP | 2005-227957 | 8/2005 |
| JP | 2006-107399 | 4/2006 |
| JP | 2007-249587 | 9/2007 |
| JP | 2011-210030 | 10/2011 |
| WO | WO 2004/021884 A1 | 3/2004 |

OTHER PUBLICATIONS

Patent Abstracts of Japan, Publication No. 2002-083298, published Mar. 22, 2002.
Patent Abstracts of Japan, Publication No. 2003-067750, published Mar. 7, 2003.
Patent Abstracts of Japan, Publication No. 2004-102993, published Apr. 2, 2004.
Patent Abstracts of Japan, Publication No. 2005-227957, published Aug. 25, 2005.
Patent Abstracts of Japan, Publication No. 2006-107399, published Apr. 20, 2006.
Patent Abstracts of Japan, Publication No. 2007-249587, published Sep. 27, 2007.
Patent Abstracts of Japan, Publication No. 2011-210030, published Oct. 20, 2011.
International Search Report mailed Jul. 3, 2012, in corresponding International Patent Application No. PCT/JP2012/063095.
Extended European Search Report dated Jan. 26, 2016 in corresponding European Patent Application No. 12877423.9.
Japanese Office Action dated Feb. 23, 2016 in corresponding Japanese Patent Application No. 2014-516560.

* cited by examiner

| 1ST IMAGE | (30, 50) | (36, 36) | (50, 36) | (68, 38) |
| 2ND IMAGE | (20, 50) | (29, 29) | (50, 29) | (77, 32) |
| 3TH IMAGE | (8, 8) | (50, 8) | | |

FIG.7

| NUMBER | PREVIOUS POSITION | CURRENT POSITION |
|---|---|---|
| 1 | (30, 50) | (20, 50) |
| 2 | (36, 36) | (29, 29) |
| 3 | (50, 36) | (50, 29) |
| 4 | (68, 38) | (77, 32) |

FIG.8

| NUMBER | PREVIOUS POSITION | CURRENT POSITION |
|---|---|---|
| 1 | (29, 29) | (8, 8) |
| 2 | (50, 29) | (50, 8) |
| 3 | (20, 50) | N/A |
| 4 | (77, 32) | N/A |

| NUMBER | PREVIOUS POSITION | CURRENT POSITION |
|---|---|---|
| 1 | (29, 29) | (8, 8) |
| 2 | (50, 29) | (50, 8) |
| 3 | (20, 50) | (−10, 50) |
| 4 | (77, 32) | (104, 14) |

FIG.11

| NUMBER | COORDINATES |
|---|---|
| 1 | (-10, 50) |
| 2 | (8, 8) |
| 3 | (50, 8) |
| 4 | (104, 14) |

FIG.12

| USER ID | AUXILIARY INFORMATION | IMAGE OF VEINS |
|---|---|---|
| 0001 | 4, -12, 50,... | 0, ... , 1, 0, ... , 1,... |
| 0002 | 4, 30, 50,... | 0, 0, 0, 1, 1, 1, 1, 0, 0,... |
| ⋮ | ⋮ | ⋮ |

(18, 26) (48, 26) (78, 26)

(18, 80) (48, 80) (78, 80)

| NUMBER | COORDINATES |
|---|---|
| 1 | (−12, 50) |
| 2 | (6, 6) |
| 3 | (48, 6) |
| 4 | (102, 14) |

| NUMBER | ESTIMATED POSITION |
|--------|--------------------|
| 1 | (−10, 50) |
| 2 | (8, 8) |
| 3 | (50, 8) |
| 4 | (104, 14) |

FIG.23

| NUMBER | COORDINATES |
|--------|-------------|
| 1 | (−16, 50) |
| 2 | (2, 8) |
| 3 | (44, 8) |
| 4 | (98, 10) |

BIOMETRIC INFORMATION PROCESSING FOR PROVIDING INCREASED AUTHENTICATION PRECISION BY GUIDING A USER TO PLACE AUXILIARY INFORMATION WITHIN AN IMAGING RANGE

CROSS-REFERENCE TO RELATED APPLICATIONS

This application is a continuation application of International Application PCT/JP2012/063095 filed on May 22, 2012 and designated the U.S., the entire contents of which are incorporated herein by reference.

FIELD

The present invention relates to a biometric information processing apparatus, a biometric information processing method, and a program that process biometric information.

BACKGROUND

Conventionally, a biometric authentication technology has been used that uses personal biometric information such as hand veins, a fingerprint, an iris, a face or the like, as an authentication method of a person who is entering or leaving a room, a facility or the like, without human intervention. Authentication using biometric information has an advantage over authentication using a magnetic card or a personal identification number (PIN) in that it does not need to care about loss, forgetfulness, and fraudulent use.

Taking an example where veins are used as biometric information, a general biometric authentication technology will be described. Basic steps of the vein authentication apparatus are as follows. First, the vein authentication apparatus irradiates near-infrared light on a part of a human body, such as a palm, where an image of veins can be easily captured, and extracts the image of veins by capturing strength distribution of reflected or transmitted light.

The vein authentication apparatus stores images of veins of individuals that have registered beforehand. Registered biometric information is also called "registration data" or "registration template". The vein authentication apparatus verifies a registration template with an obtained image of veins (called "verification data") that is captured on authentication to determine whether the two images are equivalent.

However, biometric information for the same person may fluctuate to a certain extent. Therefore, when determining the equivalence of the images of veins, fluctuation needs to be allowed to a certain extent. Typically, the vein authentication apparatus first executes positioning of the two, represents the likeness between the two by a measure called similarity, and if the similarity is greater than a threshold, determines that a person in question is one of the registered individuals.

Positioning is executed, for example, to increase a degree of the equivalence between the registration data and the verification data as much as possible, by virtually moving one of them. Here, "virtually moving" means converting the coordinate system representing an image of veins.

A registration template is usually stored in an IC card owned by a user or a storage device (database) of a server. Positioning and a calculation process of the similarity are executed by a computer located close to a user or a server under centralized management.

As a conventional technology to further improve authentication precision, a method is known that uses other information obtained together with biometric information for authentication. Such information is called "auxiliary information" below. Using auxiliary information, authentication precision can be improved with increased information, without additional imaging times at the expense of a user.

As a conventional technology that uses auxiliary information, there is a technology that extracts finger veins and finger profiles from a captured image, and executes positioning of finger directions by the finger profiles (see, for example, Patent Document 1). Also, there is a technology that detects the position and the direction of a hand, and if they are inappropriate, indicates that to the user (see, for example, Patent Document 2), or guides the user so that biometric information can be captured with an appropriate position (see, for example, Patent Document 3).

Also, there is a technology that selects the best shot of a face among moving images (see, for example, Patent Document 4).

RELATED-ART DOCUMENTS

Patent Documents

[Patent Document 1] Japanese Laid-open Patent Publication No. 2004-102993
[Patent Document 2] Japanese Republished Patent Publication No. 2004-021884
[Patent Document 3] Japanese Laid-open Patent Publication No. 2003-67750
[Patent Document 4] Japanese Laid-open Patent Publication No. 2005-227957

Assuming that veins of a palm are used for biometric authentication, usable auxiliary information in this case includes a shape profile or positions of bases (finger bases) of fingers. In the following, a base of fingers means a web part between fingers.

The shape profile and the bases of the fingers are small in terms of the number of pieces of information, and have an advantage that their positions are easy to identify because they are distributed away from each other in a captured image, which makes them suitable to be used for positioning. A problem of using auxiliary information for biometric authentication around a palm is that an entire palm may not be contained in an imaging range if the hand is larger than a usual hand, and it is not always the case that the auxiliary information is obtained. The following three conventional technologies may be used to cope with this problem, although either of them still have problems.

Guide the user so that the entire palm is contained in the imaging range

For example, in a conventional technology that executes a guidance, when a hand is too large to have the auxiliary information contained in the imaging range, the position of the hand is moved away from the position of the imaging unit so that the auxiliary information is contained in the imaging range. A problem here is that when having the hand moved away, the hand is distant from the position of the imaging unit, and sufficient brightness may not be obtained by illumination of the imaging unit, which makes imaging quality reduced, and the biometric information may not be appropriately extracted.

Do not obtain auxiliary information

For example, one may come up with a method that executes a conventional authentication process without using the auxiliary information when the auxiliary information cannot be obtained. A problem here is that authentication precision is reduced because the auxiliary information cannot be used.

Capture moving images and extract an image that captures the entire palm

For example, a configuration that selects a best shot of a face among moving images may be used for an obtainment process of the auxiliary information. However, a problem here is, similar to the first one, that when the hand is distant from the position of the imaging unit, sufficient brightness may not be obtained by illumination of the imaging unit, which makes imaging quality reduced, and the biometric information may not be appropriately extracted.

SUMMARY

According to at least an embodiment of the present invention, a biometric information processing apparatus includes a processor; and a memory, wherein the processor is configured to extract auxiliary information representing a part of a body being captured together with biometric information from a plurality of images captured by an imaging unit; to trace the auxiliary information in a time direction; to extract the biometric information from at least one image among the plurality of images; to associate the traced auxiliary information with the extracted biometric information in terms of a positional relationship; and to output the auxiliary information having been associated with the biometric information.

The object and advantages of the embodiment will be realized and attained by means of the elements and combinations particularly pointed out in the claims. It is to be understood that both the foregoing general description and the following detailed description are exemplary and explanatory and are not restrictive of the invention as claimed.

BRIEF DESCRIPTION OF DRAWINGS

FIG. 7 is a diagram illustrating correspondence of auxiliary information between a first image and a second image;

FIG. 8 is a diagram illustrating correspondence of auxiliary information between a second image and a third image;

FIG. 11 is a diagram illustrating an example of auxiliary information after tracing;

FIG. 12 is a diagram illustrating an example of a database of biometric information;

FIG. 23 is a diagram illustrating an example of auxiliary information after guidance;

DESCRIPTION OF EMBODIMENTS

Figure 1:
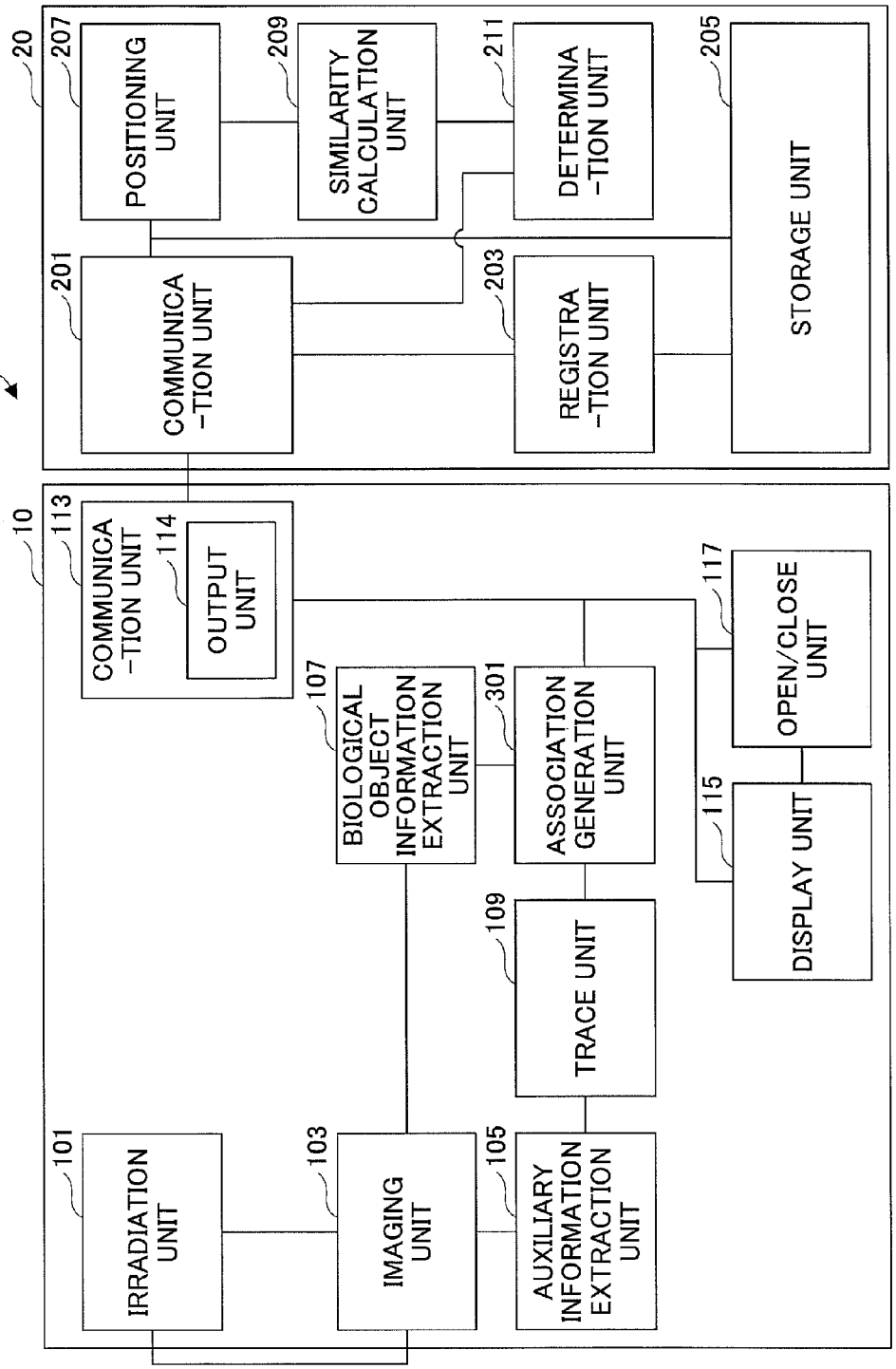
FIG. 1 is a block diagram illustrating an example of a configuration of an authentication system according to a first embodiment of the present invention.

First, the following embodiments use biometric information that can be captured, for example, with a palm for biometric authentication. Also, as auxiliary information representing a part of the body, for example, a shape profile of a palm or fingers, or bases of fingers is used. The biometric information and auxiliary information are not limited to the above examples, but other biometric information may be used, and information of the part of a body around the biometric information may be used as the auxiliary information.

Note that the auxiliary information can be extracted from a low-quality image captured at a distance. Thereupon, in the following embodiments, a scene is captured in moving images when a hand is held above an imaging unit. It is assumed that the auxiliary information is extracted from a low-quality image including the entire palm, and the biometric information is extracted from a high-quality image captured when the hand gets closer to the imaging unit.

However, they cannot be used for positioning as they are because the positional relationship between the extracted auxiliary information and biometric information is unknown. Thereupon, in the following embodiments, tracing is executed for a part of the auxiliary information in the moving images in the time direction, to associate the auxiliary information with the biometric information. In the following, the embodiments will be described based on the drawing.

[First Embodiment]

<Configuration>

First, an authentication system will be described according to a first embodiment. The authentication system 1 in the first embodiment uses veins of a palm as the biometric information, which will be described with an example of an authentication system for room entrance management combined with an automatic door. Note that the disclosed technology is not limited to the example that combines an automatic door with biometric authentication.

FIG. 1 is a block diagram illustrating an example of a configuration of the authentication system 1 according to the first embodiment. The authentication system 1 illustrated in FIG. 1 includes a biometric information processing apparatus 10 and an authentication apparatus 20. The biometric information processing apparatus 10 is an information processing apparatus that extracts the biometric information and auxiliary information, and outputs the biometric information associated with the auxiliary information to the authentication apparatus 20. The authentication apparatus 20 is a server or the like that executes an authentication process using the biometric information and auxiliary information obtained from the biometric information processing apparatus 10.

First, the biometric information processing apparatus 10 will be described. The biometric information processing apparatus 10 includes an irradiation unit 101, an imaging unit 103, an auxiliary information extraction unit 105, a biometric information extraction unit 107, a trace unit 109, an association generation unit 111, a communication unit 113, a display unit 115, and an open/close unit 117.

A user who wants to enter a room holds a hand above the biometric information processing apparatus 10 installed in an automatic door or close to the automatic door. Detecting that the palm is being held, the irradiation unit 101 irradiates near-infrared light to the palm.

The imaging unit 103 captures images of the palm having the near-infrared light irradiated. At this moment, the biometric information processing apparatus 10 may receive a user ID via an IC card or a keyboard. The imaging unit 103 outputs multiple captured images continuous in the time direction to the auxiliary information extraction unit 105 and the biometric information extraction unit 107.

From the multiple images captured by the imaging unit 103, the auxiliary information extraction unit 105 extracts the auxiliary information representing a part of the body captured with the biometric information. The auxiliary information is, for example, information about the profile of the palm or information about the bases of the fingers. The auxiliary information extraction unit 105 outputs the auxiliary information to the trace unit 109 every time it is extracted from an image, following the captured order.

The biometric information extraction unit 107 extracts the biometric information from at least one of the multiple images obtained by the imaging unit 103. The biometric information is, for example, an image of veins or a palm print. The biometric information extraction unit 107 outputs the extracted biometric information to the association generation unit 111.

The trace unit 109 traces the auxiliary information extracted by the auxiliary information extraction unit 105 in the time direction. Using a model of temporal change of the auxiliary information, the trace unit 109 replaces the auxiliary information positioned out of the imaging range with estimated values.

Also, the trace unit 109 may execute a trace using first auxiliary information extracted from an image to be traced and second auxiliary information extracted form an image just before the image to be traced, to change the model of temporal change depending on the number of pieces of the auxiliary information with which correspondences are obtained. The trace unit 109 outputs the auxiliary information after the tracing to the association generation unit 111. The auxiliary information after the tracing is information that includes replaced estimated values.

The association generation unit 111 associates the traced auxiliary information that has been extracted from an image having the biometric information extracted, with the extracted biometric information in terms of a positional relationship. The association generation unit 111 outputs the auxiliary information having the biometric information associated to the communication unit 113.

The communication unit 113 outputs the auxiliary information and biometric information obtained from the association generation unit 111, to the authentication apparatus 20 along with an authentication request or a registration request. Therefore, the communication unit 113 includes a function as an output unit 114 that outputs the auxiliary information and biometric information.

When obtaining a determination result of authentication from the authentication apparatus 20, the communication unit 113 outputs the determination result to the display unit 115 and the open/close unit 117.

If the determination result indicates that it is a registered person, the display unit 115 indicates the authentication result of allowance of room entrance to the user by a lamp or a buzzer. Or, if the determination result indicates that it is not a registered person, the display unit 115 indicates the authentication result of disapproval of room entrance to the user by the lamp or buzzer.

If the determination result indicates that it is a registered person, the open/close unit 117 controls the automatic door to open. If the determination result indicates that it is not a registered person, the open/close unit 117 controls the automatic door to be kept closed.

Note that the irradiation unit 101, the imaging unit 103, the display unit 115, and the open/close unit 117 of the biometric information processing apparatus 10 are not necessarily included in the biometric information processing apparatus 10, but may be included in another device.

Also, other than making an authentication request, the biometric information processing apparatus 10 can register the auxiliary information and biometric information to the authentication apparatus 20. Note that when making a registration request, the biometric information processing apparatus 10 receives a user ID via an IC card or a keyboard, and transmits the user ID to the authentication apparatus 20 along with the biometric information.

Next, the authentication apparatus 20 will be described. The authentication apparatus 20 includes a communication unit 201, a registration unit 203, a storage unit 205, a positioning unit 207, a similarity calculation unit 209, and a determination unit 211.

When obtaining the auxiliary information and biometric information, the communication unit 201 determines whether it is a registration request or an authentication request. The communication unit 201 outputs the auxiliary information, biometric information, and user ID received along with a registration request to the registration unit 203. Also, the communication unit 201 outputs the auxiliary information and biometric information received along with an authentication request to the positioning unit 207.

The registration unit 203 records the obtained ID as a registered person ID in the storage unit 205 by associating it with the auxiliary information and biometric information.

The storage unit 205 stores the registered person ID having the auxiliary information and biometric information associated.

The positioning unit 207 executes positioning of images of veins as the biometric information, using the auxiliary information stored in the storage unit 205. When a user ID is specified, the positioning unit 207 uses the biometric information corresponding to the ID, or otherwise, uses the biometric information of all IDs in order. The positioning unit 207 outputs both pieces of the biometric information after the positioning to the similarity calculation unit 209.

The similarity calculation unit 209 calculates similarity between the registered biometric information and the biometric information to be authenticated. A greater value of the similarity indicates that they are much more alike. The similarity calculation unit 209 outputs the calculated similarity to the determination unit 211.

The determination unit 211 determines whether the calculated similarity is greater than a threshold given beforehand. The determination result is transmitted to the biometric information processing apparatus 10 via the communication unit 201.

Note that, other than the veins, the palm print of a palm may be considered as the biometric information that may be usable in the embodiments. In case of the palm print, it is desirable to use visible light for the irradiation unit 101. Also, the embodiments can be applied in a case where an image of veins of multiple fingers or a fingerprint is captured without contacting the imaging unit 103. Types of the biometric information used for authentication are not specifically limited in the embodiments. The auxiliary information assumed in the embodiments is, for example, a shape profile or positions of bases of fingers, which has a characteristic that it can be captured along with the biometric information, and although a part of it may be go out of the imaging range when a hand gets closer to the imaging unit, another part is still contained within the imaging range.

<Processes>

Next, specific examples will be described for processes of the units of the biometric information processing apparatus 10.

<<Irradiation Unit and Imaging Unit>>

It is preferable to use an LED that irradiates, for example, near-infrared light, for the irradiation unit 101. Also, if a palm print is used as the biometric information, it is desirable to use visible light for the irradiation unit 101. It is preferable to use a CMOS camera or a CCD camera having a filter attached that cuts off visible light (visible light cutting filter) for the imaging unit 103.

Figure 2:
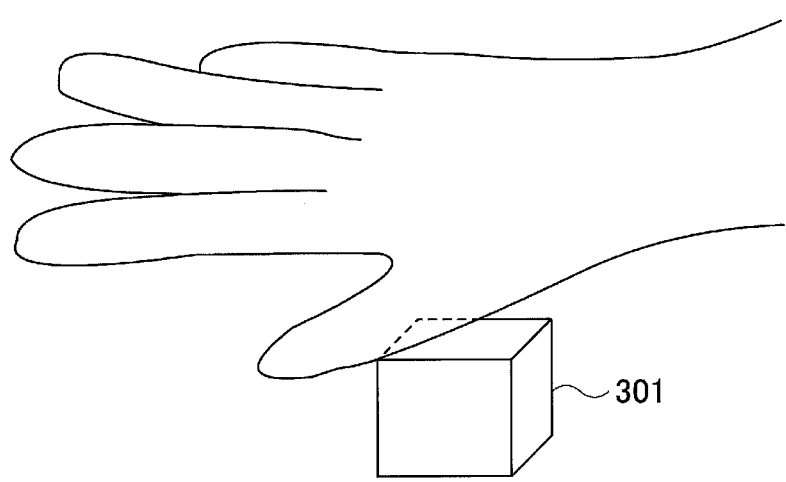
FIG. 2 is a diagram illustrating an example of an imaging unit according to the first embodiment.

FIG. 2 is a diagram illustrating an example of the imaging unit 301 according to the first embodiment. The imaging unit 301 illustrated in FIG. 2 includes the irradiation unit 101 and the imaging unit 103 unitedly. In the example in FIG. 2, a palm is held above the imaging unit 301.

A captured result is represented by moving images. The moving images are a sequence of images that are captured with predetermined time intervals. The time interval is set to, for example, 33 ms. Each image in the moving images is a two-dimensional array that includes a number of pixels where each pixel has a value (pixel value) depending on a strength of light.

Figure 3:
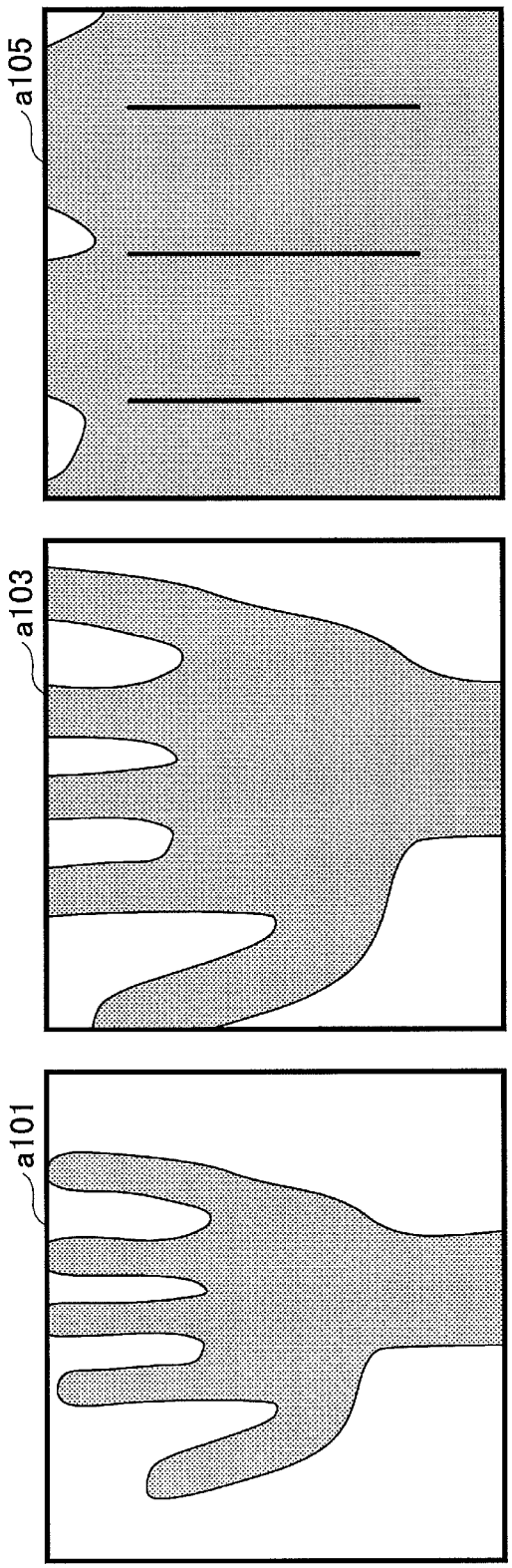
FIG. 3 is a diagram illustrating an example of images included in captured moving images.

Note that the process describe below is executed every time an image is captured. FIG. 3 is a diagram illustrating an example of images included in captured moving images. The example illustrated in FIG. 3 illustrates three images.

In the example illustrated in FIG. 3, captured time gets newer for an image a101, an image a103, and an image a105, in this order. Namely, the images illustrated in FIG. 3 are images that capture a situation where a hand is gradually getting closer to the imaging unit 301. Also, the image size is assumed to be, for example, 100×100.

<<Auxiliary Information Extraction Unit>>

First, a profile extraction method will be described assuming that a profile is used as the auxiliary information. The method extracts images of veins as well. A captured image has a bright background, a comparatively dark hand area, and a darker pattern of veins. Therefore, the auxiliary information extraction unit 105 can extract the auxiliary information, for example, by converting the captured image into a ternary-valued one as follows.

(A1) If the value of a pixel is greater than a predetermined first threshold, the auxiliary information extraction unit 105 sets the value to 0, which represents the background.

(A2) If the value of a pixel is less than the predetermined first threshold and greater than a predetermined second threshold (<first threshold), the auxiliary information extraction unit 105 sets the value to 2, which represents the palm.

(A3) Otherwise, the auxiliary information extraction unit 105 sets the value to 1, which represents the veins.

The first threshold is set to a value less than an average pixel value of the background. If the range of pixel values is set between 0 and 255, the first threshold is set to, for example, a value 150. The second threshold value is set to a value less than the first threshold. Also, the second threshold is set to a value greater than an average pixel value in an image of veins. For example, the second threshold is set to, for example, a value 60.

After making the image ternary-valued, the auxiliary information extraction unit 105 scans all pixels one by one, and if a pixel of interest has the value 2 representing the palm, and its adjacent pixel has the value 0 representing the background, changes the value of the pixel of interest to a value 4, which represents the profile. Finally, the auxiliary information extraction unit 105 obtains coordinates of the pixels representing the profile by the following method.

(B1) The auxiliary information extraction unit 105 provides an array for storing coordinates. It also provides a variable for storing the number of points, and initializes the variable to 0.

(B2) The auxiliary information extraction unit 105 scans the image, and when it finds a pixel whose value is 4 representing the profile, records the coordinates in the array, and increases the value of the variable storing the number of points by one. In this way, the profile information is extracted as the auxiliary information.

Next, a method of extracting bases of fingers will be described assuming that the bases of fingers are used as the auxiliary information. A captured image has a bright background, and a comparatively dark palm area. Therefore, the auxiliary information extraction unit 105 can extract the auxiliary information, for example, based on a ternary-valued image, which is substantially the same as the above profile extraction method. Here, it is assumed that a palm is held so that the fingers are positioned on the upper side of the image.

(C1) The auxiliary information extraction unit 105 scans the image starting from the upper-end pixels in the downward direction, and if detecting a change of a pixel value from 0 (representing the background) to 2 (representing the palm), then changes the value of the pixel to 5 representing a base candidate.

(C2) The auxiliary information extraction unit 105 scans all pixels in the image one by one, and if finding a pixel whose value is 5 that represents a base candidate, then examines the values of pixels at left and right. If the values of the pixels at left and right are 2 that represent the palm, the auxiliary information extraction unit 105 changes the value 5 to 6 that represents a base.

Figure 4:
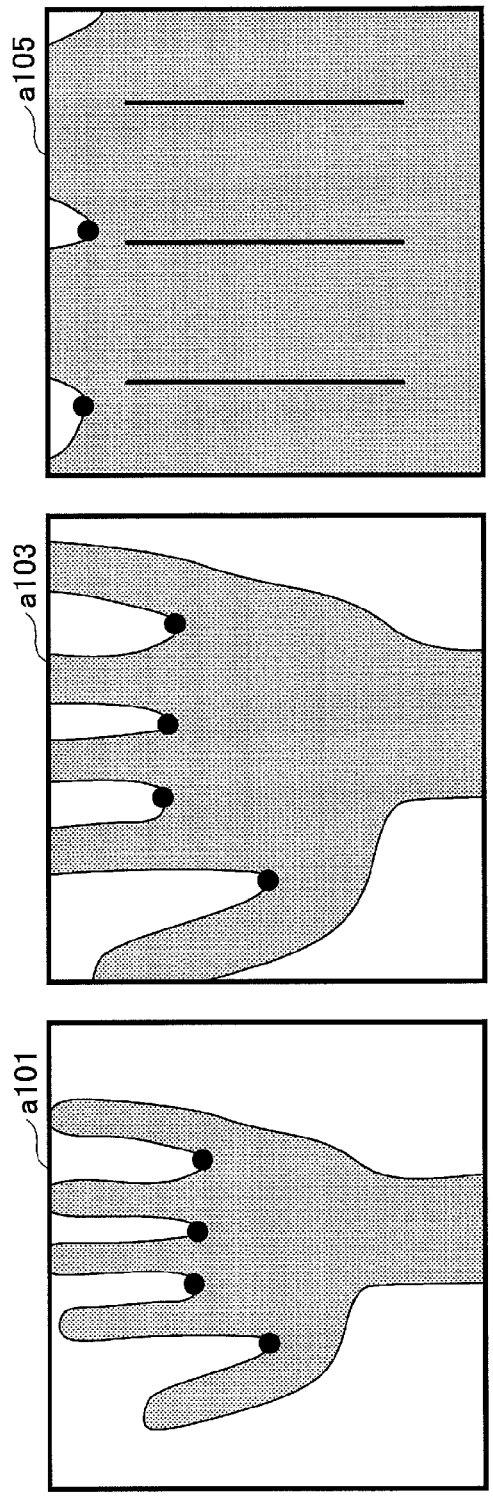
FIG. 4 is a diagram illustrating an extraction example of bases of fingers for images.

The auxiliary information extraction unit 105 stores the coordinates of the pixels that represent bases of fingers into an array by substantially the same method as that of profile extraction. FIG. 4 is a diagram illustrating an extraction example of bases of fingers for the images. In the example illustrated in FIG. 4, a coordinate system to represents the coordinates has the origin at the upper left of an image, the x-axis in the horizontal direction (rightward positive), the y-axis in the vertical direction (downward positive).

Figures 5, 6:
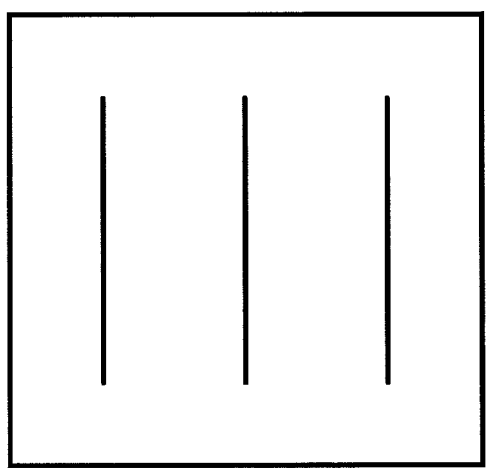
FIG. 5 is a diagram illustrating an example of an extraction result of bases.
FIG. 6 is a diagram illustrating an example of extracted biometric information.

FIG. 5 is a diagram illustrating an example of an extraction result of bases. The first image in FIG. 5 corresponds to the image a101, the second image corresponds to the image a103, and the third image corresponds to the image a105. In the third image, the user's hand may be too close to the imaging unit, or too big, and only two pieces of the auxiliary information are extracted.

<<Biometric Information Extraction Unit>>

As an extraction method of veins as an example of the biometric information, the extraction method executed by the biometric information extraction unit 107 is described above that also extracts the auxiliary information. For example, the biometric information extraction unit 107 may extract pixels having the value 1.

In the following, it is assumed that the biometric information extraction unit 107 extracts veins from the images illustrated in FIG. 4. The biometric information extraction unit 107 cannot extract an image of veins from the first image a101 or the second image a103 illustrated in FIG. 4. This is because the first image and the second image are away from an appropriate position from the imaging unit.

The biometric information extraction unit 107 extracts the biometric information from the third image a105. FIG. 6 is a diagram illustrating an example of the extracted biometric information.

In the example illustrated in FIG. 6, the image of veins is constituted with three line segments where the first line segment has end points at (20, 20) and (20, 80), the second line segment has end points at (50, 20) and (50, 80), and the third line segment has end points at (80, 20) and (80, 80). In the example illustrated in FIG. 6, a simplistic image of veins is illustrated for the sake of explanation.

Note that, according to the extraction method of the auxiliary information and biometric information described above, the auxiliary information is represented by an array of coordinates, and the image of veins is represented by a binary-valued image. To reduce memory capacity and/or to speed up the similarity calculation process, another method may be considered that calculates and stores a characteristic amount from an image of veins, and when executing authentication, calculates the similarity by comparing the characteristic amounts.

As the characteristic amount, for example, one may consider coordinates of points constituting the image of veins; vertices of broken lines that approximate the image of veins by thin lines; or coordinates of characteristic points such as branch points and endpoints. Any of these may be used as a representation form of the image of veins in the embodiments.

<<Trace Unit>>

The trace unit 109 traces the auxiliary information extracted from the images in the time direction. In the following, cases will be described where finger bases and a shape profile of a palm are used as the auxiliary information, respectively.

(Case of Finger Bases)

A method of tracing the auxiliary information in moving images will be described when using finger bases as the auxiliary information.

(D1) Initialization

The trace unit 109 provides an array to store positions of initialized bases. The trace unit 109 provides a variable to represent whether a value is set in this array, and sets a value represents that a setting has not been made.

(D2) Existence Confirmation

As existence confirmation of data, the trace unit 109 determines whether data (auxiliary information) to be processed exists. If the data is removed at the end of an authentication process, the trace unit 109 ends the process.

(D3) Read Auxiliary Information

Among moving images of the auxiliary information being read, the trace unit 109 reads positions of bases for one of the images to be traced. In the following, one or more bases extracted from the image to be traced may also be referred to as the "first bases" or the "current bases".

For the first time when positions of the bases are not stored in the array, the trace unit 109 stores the positions of the first bases, and changes the variable representing whether a value is stored to a value representing that the setting has been made. When storing the positions of the bases, the trace unit 109 arranges individual bases in a row based on a predetermined criteria, and stores them in the array in that order.

(D4) Case of First Time Process

When it is the first time process, the trace unit 109 does not execute an association generation process of the auxiliary information that follows.

(D5) Association Generation with Auxiliary Information

The trace unit 109 associates second bases with the first bases. The second bases are also referred to as the previous bases, which corresponds to one or more bases extracted from the immediately preceding image among the images to be traced. Association generation will be described in detail later.

At this moment, for a part of the second bases that cannot be associated with, the trace unit 109 determines that they are out of the imaging range, executes an estimation of the positions of the bases, and uses the estimated positions instead. These compensates for a lack of the auxiliary information, when the auxiliary information is partially out of the imaging range. Based on the obtained associations, the first bases are arranged so that corresponding individual bases come in the same order. The trace unit 109 stores the arranged result in the array. The trace unit 109 repeats the above process for the next image in the moving images.

Next, a method of association generation and estimation of the auxiliary information executed by the trace unit 109 will be described. First, it determines which bases of the previous bases correspond to those of the current bases. The trace unit 109 associates, for example, one of the first bases (also referred to as the "base to be associated") with one of the second bases that has the least distance (the root square of differences of the coordinates).

If the distance is greater than a predetermined threshold (for example, one third of the image size), the trace unit 109 sets "not associated" to the base to be associated. It arranges the first bases with an appropriate method, and gives them numbers starting from one. The appropriate method is a method, for example, that arranges the bases in ascending order of the coordinates in the horizontal direction.

It gives the second bases the same numbers as the associated first bases. For a second base that is not associated with a first base, it gives a new number. The number of a base is represented by a subscript i.

In this way, the positions of the second bases are represented by $(p_i, q_i)$ (i=1, ..., m, n+1, ..., k), and the positions of the first bases are represented by $(x_i, y_i)$ (i=1, ..., n), which are arrays of the coordinates. Here, m represents the number of associated bases, n−m represents the number of bases with which only the first bases exist, and k−n represents the number of bases with which only the second bases exist.

A result of association generation of bases will be described for the extraction example illustrated in FIG. 5. FIG. 7 is a diagram illustrating a correspondence of the auxiliary information between the first image (previous positions) and the second image (current positions). In the example illustrated in FIG. 7, the numbers are set m=4, n=4, and k=4. FIG. 8 is a diagram illustrating a correspondence of the auxiliary information between the second image (previous positions) and the third image (current positions). In the example illustrated in FIG. 8, the numbers are set m=2, n=2, and k=4.

Next, the trace unit 109 models temporal change of the auxiliary information. In a scene where a hand is being held, although the coordinates of the bases on captured images change moment by moment, the change follows a certain rule that depends on the posture of the a hand.

For example, if the palm approaches perpendicularly to the line of sight of the camera, the change of the coordinates of the bases is approximated appropriately by two-dimensional enlargement and reduction. That is represented by a formula as follows. Representing the position of one of the bases of the second bases by (p, q), and the position of the associated first base by (x, y), Formula (I) is satisfied.

$$x=s(p-c_x)+c_x, \ y=s(q-c_y)+c_y \quad \text{Formula (1)}$$

where s represents an enlargement ratio, which is a positive real number, and $c_x$ and $c_y$ represent the center of the optical axis of the camera, which is virtually equivalent to the center of the image.

Next, the trace unit 109 obtains model parameters. When using two-dimensional enlargement reduction as the model, the model parameter is the enlargement ratio s. For example, the least squares method is used for calculating the model parameter. Specifically, s that minimizes the following evaluation function is taken as a solution.

$$E(s) = \sum_{i=1}^{m} [(s(p_i - c_x) - (x_i - c_x))^2 + (s(q_i - c_y) - (y_i - c_y))^2] \quad \text{Formula (2)}$$

The trace unit 109 can easily minimize the above evaluation function because it is a quadratic formula with respect to s. The solution is represented as follows.

$$s = \frac{\sum_{i=1}^{m} [(p_i - c_x)(x_i - c_x) + (q_i - c_y)(y_i - c_y)]}{\sum_{i=1}^{m} [(p_i - c_x)^2 + (q_i - c_y)^2]} \quad \text{Formula (3)}$$

In the example of association generation in FIGS. 7-8, assuming that the center of the optical axis is equal to the center of the image at $c_x$=50 and $c_y$=50, calculation using the above formula results in s=1.5 and s=2, respectively. Namely, as the palm approaches the imaging unit, the result shows that the first image and the second image have the enlargement ratio of 1.5, and the second image and the third image have the enlargement ratio of 2.

Finally, for the second bases (p, $q_i$)(i=n+1, . . . , k) that are not associated with the first bases, the trace unit 109 estimates the positions ($x_i$, $y_i$) on the image of the first bases by a formula below.

$$x_i=s(p_i-c_x)+c_x, \ y_i=s(q_i-c_y)+c_y \quad \text{Formula (4)}$$

Figures 9, 10:
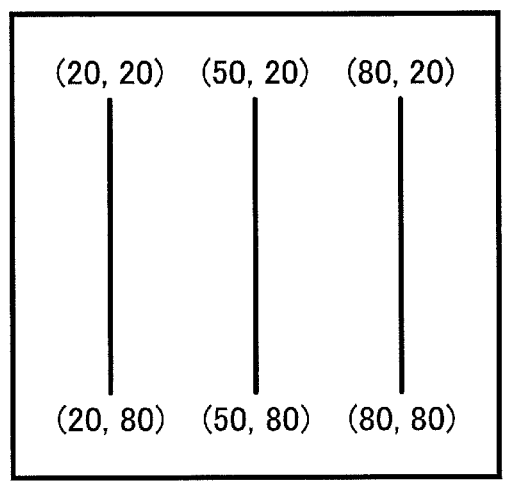
FIG. 9 is a diagram illustrating an example of auxiliary information having an association generated including estimated values.
FIG. 10 is a diagram illustrating an example of biometric information.

By associating the second image with the third image illustrated in FIG. 8, a result including estimated values by Formula (4) is obtained as illustrated in FIG. 9.

FIG. 9 is a diagram illustrating an example of the auxiliary information having the association generated including the estimated values. In FIG. 9, the estimated values are inserted for the current positions of bases number 3 and number 4 as they are out of the imaging range.

Note that, as a model that allows more flexible postures, the trace unit 109 uses, for example, an affine transform. If a palm makes a movement such as rotation, translation, or approaching the imaging unit while being in a state perpendicular to the line of sight of the camera, change of the coordinates of the bases of fingers can be appropriately approximated by the affine transform. The affine transform is a transformation that includes two-dimensional translation, rotation, enlargement, and reduction. It is represented by a formula as follows.

Representing the position of one of the bases of the second bases by (p, q), and the position of the associated first base by (x, y), a formula below is satisfied.

$$x=a_xp+b_xq+c_x, \ y=a_yp+b_yq+c_y \quad \text{Formula (5)}$$

where $a_x$, $b_x$, $c_x$, $a_y$, $b_y$, and $c_y$ are unknown parameters to represents the affine transform.

Determination of these parameter can also be done by, for example, the least squares method. In this case, the trace unit 109 takes parameters that minimize the following evaluation function as a solution.

$$E(a_x, b_x, c_x, a_y, b_y, c_y) = \quad \text{Formula (6)}$$
$$\sum_{i=1}^{m} [(a_xp_i + b_xq_i + c_x - x_i)^2 + (a_yp_i + b_yq_i + c_y - y_i)^2]$$

As the above evaluation function is a quadratic formula with respect to the unknown parameters, a solution can be easily obtained by solving simultaneous linear equations where the first-order differentials are set to 0.

Note that to obtain a solution, the number of associated bases m needs to be greater than or equal to three because the number of unknown parameters for the affine transform is six. If m is less than three, it may be treated as, for example, a trace failure, and the user may be requested to hold the hand again. Alternatively, a simpler transform than the affine transform may be used. As a simpler transform than the affine transform, for example, a similarity transformation may be considered. The similarity transform is a restricted affine transform where $a_x$=$b_y$ and $b_x$=−$a_y$. Therefore, the trace unit 109 can obtain a solution even if the number of the associated bases m is two because the number of unknown parameters is four. If using the affine transform, for the second bases (p, $q_i$)(i=n+1, . . . , k) that are not associated with the first bases, the trace unit 109 estimates the positions ($x_i$, $y_i$) on the image of the first bases by a formula below.

$$x_i=a_xp_i+b_xq_i+c_x, \ y_i=a_yp_i+b_yq_i+c_y \quad \text{Formula (7)}$$

Moreover, as another model that allows more flexible postures, for example, a projective transform may be considered. That is represented by a formula as follows. Representing the position of one of the bases of the second bases by (p, q), and the position of the associated first base by (x, y), a formula below is satisfied.

$$x = \frac{a_{11}p + a_{12}q + a_{13}}{a_{31}p + a_{32}q + a_{33}}, \quad \text{Formula (8)}$$
$$y = \frac{a_{21}p + a_{22}q + a_{23}}{a_{31}p + a_{32}q + a_{33}}$$

The projective transform is a model where the shape of a palm is viewed as a plane in a three dimensional space and the optical system of the imaging unit 103 is viewed as a perspective projection, which can be used when the palm is tilted. However, to determine the model parameters, it requires four associated points.

Note that, the trace unit 109 may change the model to use based on the number of associated points of the auxiliary information. The trace unit 109 may use, for example, the projective transform model if m is four, use the affine transform model if m is three, use the similarity transformation model if m is two, or use the enlargement reduction model if m is one.

(Case of Profile)

Next, it will be described when using a profile as the auxiliary information. It is different from the case of finger bases in that points forming a profile are continuously connected, which makes it not easy to associate points in a previous profile with those in a current profile. To solve this problem, for example, the following two method may be considered.

- A method that selects characteristic points among the points forming a profile; and
- A method that models temporal change of the points forming a profile to determine transformation parameters without generating associated points. As for selection of the characteristic points in the first method, for example, maximal points of curvature (points having greater directional changes) may be used. Instead, the trace unit 109 may select several points so that when forming two line segments between a point of interest and two points away from the point by a certain number of pixels (for example, five pixels), the angle formed by the two line segments is greatly bended compared to 180 degrees than angles formed by other points. Once the characteristic points are selected, tracing can be made by substantially the same method as that for finger bases.

As an example of the second method, a method will be described that uses two-dimensional enlargement and reduction as the model. In the following, the steps will be described.

(E1) The trace unit 109 provides variables to hold a minimum value of the sum of initialized distances and the enlargement ratio at that moment. As the minimum value, infinity or a sufficiently great value is set. The trace unit 109 sets, for example, 0.5, as the initial value of the enlargement ratio s.

(E2) The trace unit 109 converts coordinates of points forming a current boundary, by the enlargement ratio obtained with the calculated distance. The trace unit 109 obtains points forming the previous boundary that are closest to the respective converted coordinates, and obtains the sum of the distances to those points.

(E3) The trace unit 109 compares the sum of the calculate distances with the minimum value so far, and if it is less, replaces the minimum value, and holds the enlargement ratio at that moment.

(E4) The trace unit 109 increases the enlargement ratio s by an appropriate step width (for example, 0.1). The trace unit 109 stops when it reaches an upper limit (for example, 2).

(E5) The trace unit 109 repeatedly executes calculation of distances.

By the above method, profile points can be associated so that each point forming the current boundary is associated with a point forming the previous boundary that is closest to the converted coordinates. Similarly to the tracing of finger bases, the trace unit 109 may set a threshold for the distance.

<<Association Generation Unit>>

The association generation unit 111 puts the auxiliary information obtained by tracing and the extracted biometric information into a package of data. The association generation unit 111 does not execute association generation for an image with which the biometric information is not obtained. A result of association generation for the example of the moving images illustrated in FIG. 3 is illustrated in FIG. 10 and FIG. 11.

FIG. 10 is a diagram illustrating an example of the biometric information. FIG. 11 is a diagram illustrating an example of the auxiliary information after tracing. In the example illustrated in FIG. 11, coordinates are sorted in ascending order of the x coordinate. The association generation unit 111 associates the biometric information illustrated in FIG. 10 with the auxiliary information illustrated in FIG. 11.

<<Storage unit>>

The storage unit 205 of the authentication apparatus 20 associates and stores a user ID with the auxiliary information and an image of veins as the biometric information. The storage unit 205 is typically implemented in the authentication apparatus 20 as a database having the following format.

FIG. 12 is a diagram illustrating an example of the database of the biometric information. In the example illustrated in FIG. 12, the auxiliary information and images of veins are converted into strings of numbers following a predetermined rule to be stored. For example, in the database illustrated in FIG. 12, a piece of the auxiliary information is represented by the number of points followed by a string of horizontal and vertical coordinates, and the image of veins is represented by a string of pixel values.

Figures 13, 14:
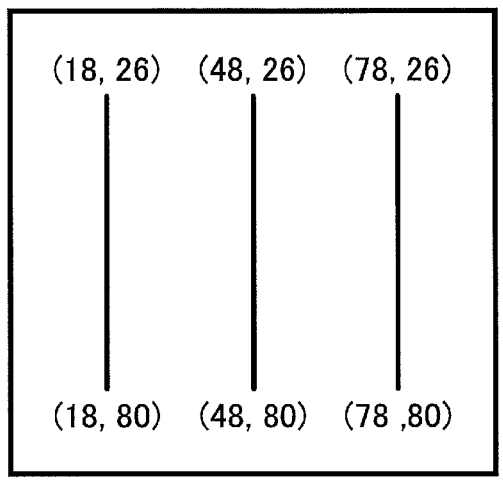
FIG. 13 is a diagram illustrating an example of registered biometric information.
FIG. 14 is a diagram illustrating an example of registered auxiliary information.

FIG. 13 is a diagram illustrating an example of registered biometric information. The example illustrated in FIG. 13 is an image of veins as the registered biometric information. FIG. 14 is a diagram illustrating an example of registered auxiliary information. The biometric information illustrated in FIG. 13 and the auxiliary information illustrated in FIG. 14 are registered, having been associated with a user ID "0001" illustrated in FIG. 12.

As illustrated in FIG. 12, the auxiliary information illustrated in FIG. 14 includes four as the number of points, and coordinates sorted in ascending order of horizontal (x) and vertical (y) values, which are registered as "4, −12, 50, . . . " in the storage unit 205.

Also, as illustrated in FIG. 12, the biometric information illustrated in FIG. 13 has its pixel values arranged in predetermined order, and registered as "0, . . . , 1, 0, . . . , 1, . . . " in the storage unit 205.

<<Positioning Unit>>

Next, an example of a method of positioning will be described that uses the auxiliary information. Here, only positioning by translation will be treated. For example, coordinates of verification data are taken as references to determine move amounts of coordinates of registration data.

(F1) Initialization

For initialization, the positioning unit 207 provides variables to hold the sums of coordinates of the auxiliary information, and initializes them to 0. The initialization process is separately executed for the x coordinate and the y coordinate.

(F2) Sum Calculation of Coordinates

The positioning unit 207 calculates the sums of coordinates of the auxiliary information for the registration data and the verification data, respectively.

(F3) Calculation of Position of the Center of Gravity

The positioning unit 207 divides the sum of the coordinates by the number of points of the auxiliary information to calculate the position of the center of gravity.

(F4) Calculation of Move Amounts

The positioning unit 207 calculates move amounts by subtracting the position of the center of gravity of the registration data from the position of the center of gravity of the verification data.

The positioning unit 207 calculates the move amounts with the verification data illustrated in FIG. 11 and the registration data illustrated in FIG. 14, and obtains (2, 1) as the move amounts. Therefore, the registration data after the positioning for the image of veins is as illustrated in FIG. 15.

Figure 15:
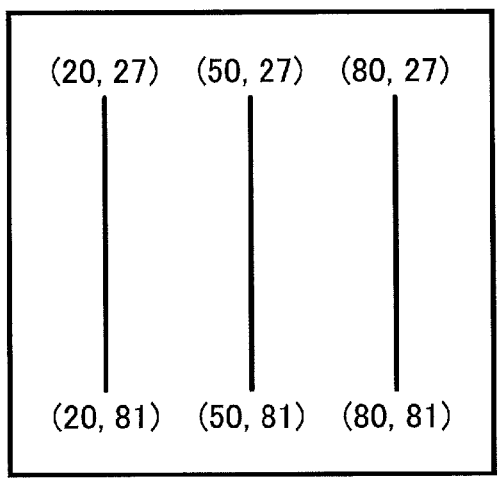
FIG. 15 is a diagram illustrating an example of biometric information after positioning.

FIG. 15 is a diagram illustrating the example of the biometric information after the positioning. The example illustrated in FIG. 15 is an example where the biometric information illustrated in FIG. 13 is moved by (2, 1).

Note that, due to instability of the posture of a hand, various changes other than translation, such as rotation, may occur between registration data and verification data. Therefore, the positioning unit 207 can use a complex movement method to cope with such changes. Also, the positioning unit 207 can execute positioning using both the auxiliary information and the images of veins. In the embodiments, any of these methods may be used as the method of the positioning process.

Figure 16:
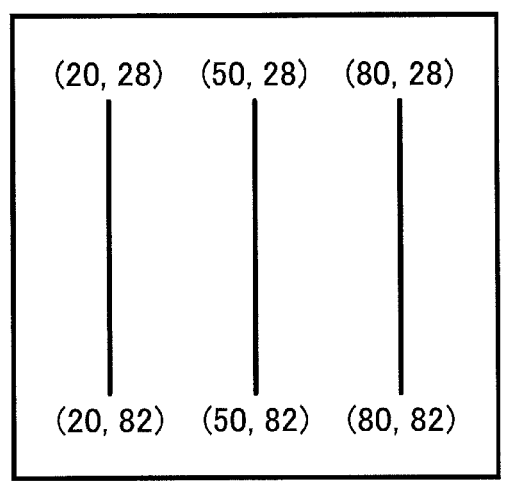
FIG. 16 is a diagram illustrating an example of biometric information after positioning without tracing.

Note that if tracing for the auxiliary information is not executed when registration or authentication is performed, it results in lack of the first and fourth pieces of the auxiliary information in the extraction example illustrated in FIG. 11 and the registration data example in FIG. 14. In this case, the move amounts are set to (2, 2). The registration data after positioning the image of veins is as illustrated in FIG. 16. FIG. 16 is a diagram illustrating the example of the biometric information after the positioning without tracing. The biometric information illustrated in FIG. 16 is shifted in the y direction by "1" compared to the biometric information illustrated in FIG. 15.

<<Similarity Calculation Unit>>

If an image of veins is represented by a binary-valued image, the similarity calculation unit 209 calculates the similarity by, for example, the following method.

(G1) Initialization

The similarity calculation unit 209 sets a pixel of interest at the upper left of an image. It provides a variable (counter) to hold the number of matched pixels, and a variable to hold the number of pixels that forms the image of veins, and initializes them to 0, respectively.

(G2) Comparison of Pixel Values

The similarity calculation unit 209 obtains values of the respective pixels of interest in the two images, and compares them. If both represent the image of veins, the similarity calculation unit 209 increases the value of the counter for the number of matched pixels by one. If one of them represents the image of veins, it increases the value of the counter for the image of veins by one.

(G3) Movement of Pixel of Interest

The similarity calculation unit 209 moves the pixel of interest to the right by one. If the pixel of interest is at the right end, the similarity calculation unit 209 moves the pixel of interest to the left end in one line below. If the pixel of interest is at the lower right, the similarity calculation process ends.

(G4) Repetition

The similarity calculation unit 209 compares the pixel values again.

(G5) Similarity Output

After having processed all pixels, the similarity calculation unit 209 sets the similarity with a value obtained by dividing the value of the counter of the number of matched pixels by the value of the counter of the image of veins.

A calculation result of the similarity between the extraction example illustrated in FIG. 11 and the registration data example illustrated in FIG. 15 is as follows.

$$162/186 \approx 0.871$$

If tracing of the auxiliary information is not executed as illustrated in FIG. 16, the calculation result of the similarity is as follows.

$$159/189 \approx 0.841$$

It can be understood from these results that tracing of the auxiliary information makes positioning more precise, and improves the similarity.

<<Determination Unit>>

The determination unit 211 compares the similarity calculated by the similarity calculation unit 209 with a threshold Th set beforehand, and if it is greater than the threshold Th, determines that it is the person in question or one of the registered persons.

An example of a method to determine the threshold Th is as follows. It collects, for example, biometric information of a considerable number of people for an evaluation purpose, calculates a false acceptance rate (a rate of false authentication in that data to be verified of a person in question falsely coincides with the registered data of another person) with the collected biometric information and various threshold values. Then, it examines the threshold values to obtain a false acceptance rate of 1/10000 (the same precision as a four-digit personal identification number) to obtain a threshold value Th to be used.

Next, an example of a determination result will be described. Suppose that the threshold is set to 0.85. Since the similarity of 0.841 is obtained when not executing tracing of the auxiliary information, the determination unit 211 does not determine that it is the person in question. Since the similarity of 0.871 is obtained when executing tracing of the auxiliary information, the determination unit 211 determines that it is the person in question. Therefore, tracing of the auxiliary information improves the biometric authentication system.

By transmitting this determination result to the biometric information processing apparatus 10, for example, the automatic door is controlled to be opened or closed.

<Operations>

Figure 17:
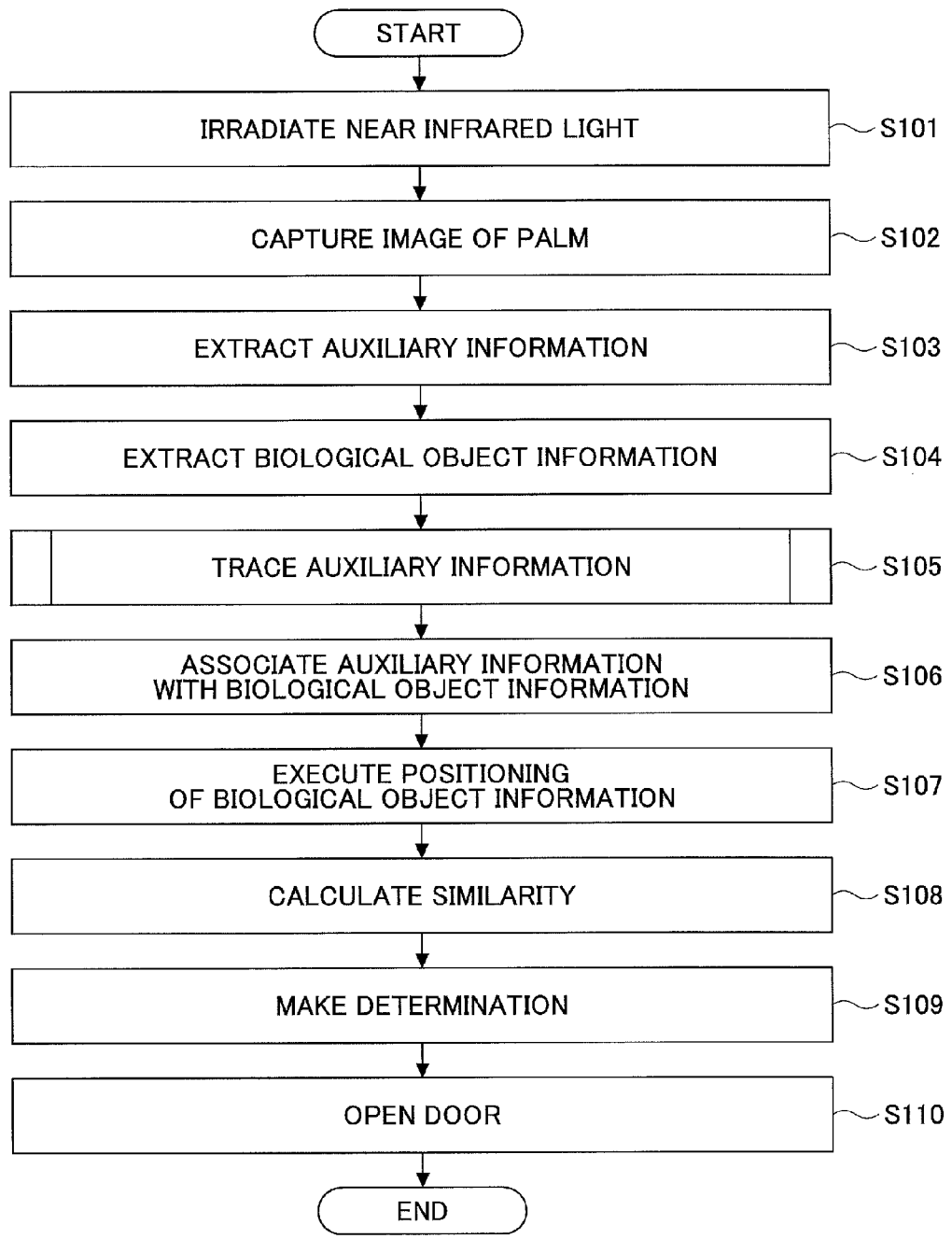
FIG. 17 is a flowchart illustrating an example of an authentication process according to the first embodiment.

Next, operations of the authentication system 1 will be described. First, the authentication process will be described. FIG. 17 is a flowchart illustrating an example of the authentication process according to the first embodiment. At Step S101 illustrated in FIG. 17, when detecting that a palm is being held over, the irradiation unit 101 irradiates near-infrared light onto the palm. Note that a part of a body with which the biometric information is obtained is not limited to a palm although it is taken as an example.

At Step S102, the imaging unit 103 captures images of the palm having the near-infrared light irradiated. At this moment, a user ID may be received from an IC card or the keyboard.

At Step S103, the auxiliary information extraction unit 105 extracts the auxiliary information representing the part of the body, which is captured along with the biometric information, from the multiple images captured by the imaging unit 103. The auxiliary information is, for example, information about the profile of the palm or information of the bases of fingers.

At Step S104, the biometric information extraction unit 107 extracts the biometric information from at least one of the multiple images obtained from the imaging unit 103. The biometric information is, for example, the image of veins or the palm print.

At Step S105, the trace unit 109 traces the auxiliary information extracted by the auxiliary information extraction unit 105 in the time direction. Using a model of temporal change of the auxiliary information, the trace unit 109 replaces the auxiliary information positioned out of the imaging range with estimated values.

Also, the trace unit 109 may execute a trace using first auxiliary information extracted from an image to be traced and second auxiliary information extracted form an image just before the image to be traced, to change the model of temporal change depending on the number of pieces of the auxiliary information with which correspondences are obtained.

At Step S106, the association generation unit 111 associates the traced auxiliary information that has been extracted from an image having the biometric information extracted, with the extracted biometric information in terms of a positional relationship.

At Step S107, the positioning unit 207 executes positioning of images of veins as biometric information, using the auxiliary information stored in the storage unit 205.

At Step S108, the similarity calculation unit 209 calculates similarity between the registered biometric information (registration data) and the biometric information to be authenticated (verification data).

At Step S109, the determination unit 211 determines whether the calculated similarity is greater than a threshold given beforehand. The determination result is transmitted to the biometric information processing apparatus 10 via the communication unit 201.

At Step S110, if the determination result indicates that it is a registered person, the open/close unit 117 controls the automatic door to open. If the determination result indicates that it is not a registered person, the open/close unit 117 controls the automatic door to be kept closed.

Note that Step S103 and Steps S104 to S105 may be executed in a different order.

Figure 18:
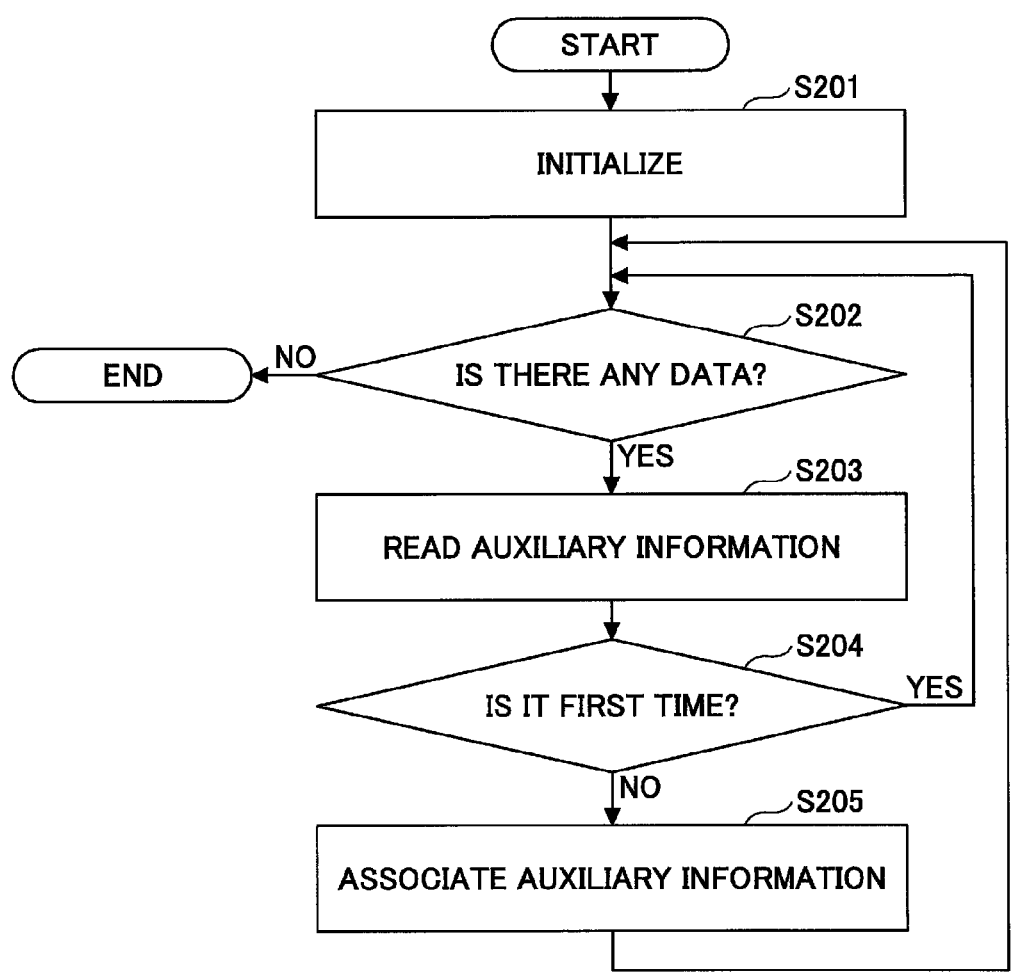
FIG. 18 is a flowchart illustrating an example of a trace process of auxiliary information according to the first embodiment.

Next, the trace process of the auxiliary information will be described. FIG. 18 is a flowchart illustrating an example of the trace process of the auxiliary information according to the first embodiment. At Step S201 illustrated in FIG. 18, the trace unit 109 provides an array to store positions of initialized bases. The trace unit 109 provides a variable to represent whether a value is set in this array, and sets a value represents that setting has not been made.

At Step S202, to confirm existence of data, the trace unit 109 determines whether data (auxiliary information) to be processed exists. If the auxiliary information exists (YES at Step S202), the process goes forward to Step S203, or if the auxiliary information does not exist (NO at Step S202), the process ends.

At Step S203, among moving images of the auxiliary information being read, the trace unit 109 reads positions of bases for one of the images to be traced.

At Step S204, the trace unit 109 determines whether it is the first time processed.

If it is the first time processed (YES at Step S204), the process goes forward to Step S202, or if it is not the first time process (NO at Step S204), the process goes forward to Step S205.

At Step S205, the trace unit 109 associates the second bases with the first bases. The trace unit 109 repeats the above process for the next image in the moving images.

Figure 19:
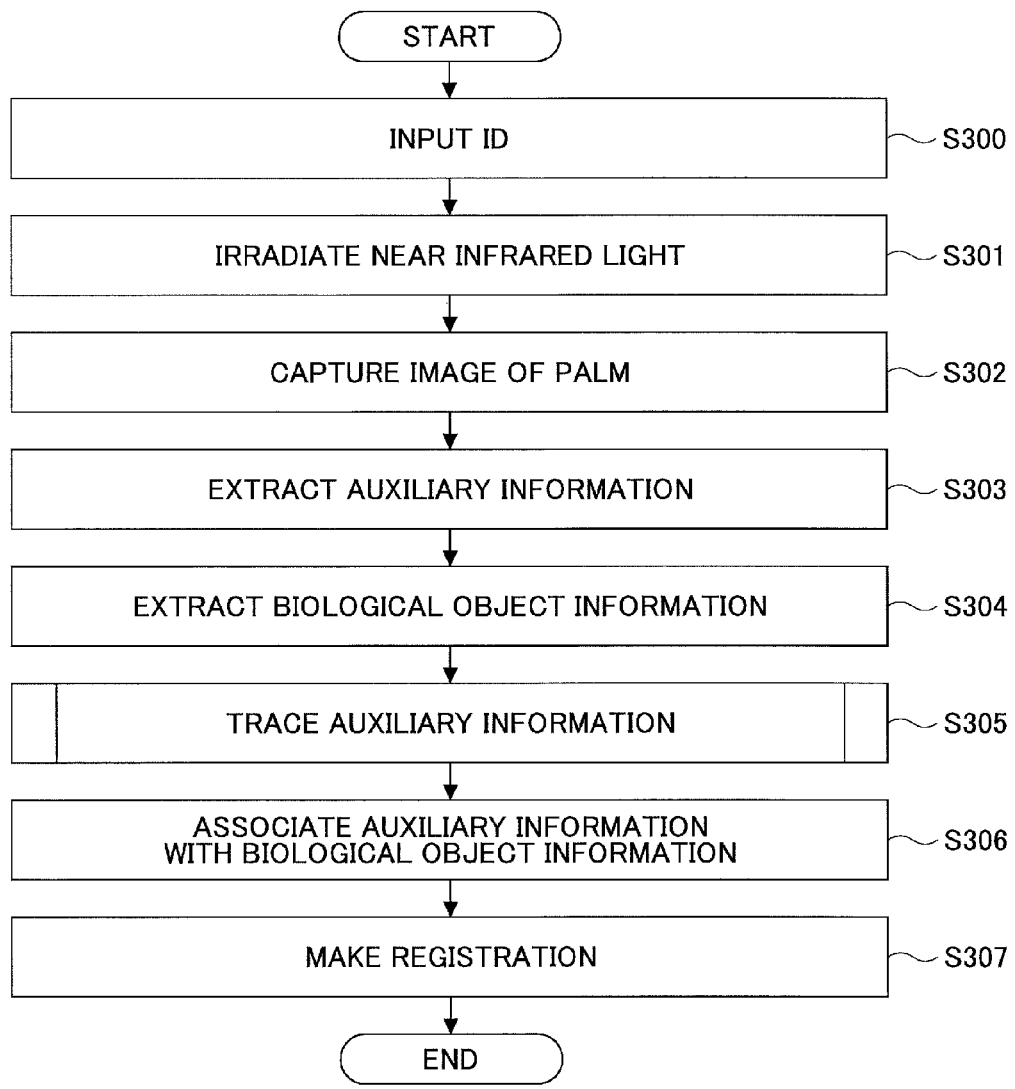
FIG. 19 is a flowchart illustrating an example of a registration procedure of biometric information and auxiliary information according to the first embodiment.

Next, the registration procedure of the biometric information and auxiliary information will be described. FIG. 19 is a flowchart illustrating an example of a registration procedure of the biometric information and auxiliary information according to the first embodiment. At Step S300 illustrated in FIG. 19, the biometric information processing apparatus 10 receives a user ID as input via an IC card or a keyboard.

Steps S301 to S306 are the same as Steps S101 to S106 illustrated in FIG. 17, and their description is omitted. At this moment, the communication unit 113 transmits the user ID, auxiliary information, and biometric information to the authentication apparatus 20.

At Step S307, the registration unit 203 records the obtained ID as a registered person ID in the storage unit 205 by associating it with the auxiliary information and biometric information. Thus, the biometric information can be registered having associated with the traced auxiliary information.

As above, according to the first embodiment, authentication precision of the biometric information can be improved even if the auxiliary information is not included in the imaging range at an appropriate imaging position. For example, according to the first embodiment, the auxiliary information can be obtained for a large hand not contained in the imaging range when biometric authentication is executed with the biometric information around the hand. Here, a large hand is a hand whose entire auxiliary information is not contained in the imaging range.

[Second Embodiment]

Next, an authentication system will be described according to a second embodiment. The first embodiment assumes that a part of the auxiliary information can be traced. However, there is a likelihood in that tracing of the auxiliary information cannot be executed if the hand posture of a user is inadequate. Thereupon, in the second embodiment, guidance is executed for a user so that as much of the auxiliary information can be captured as possible.

By guiding a user in a direction where obtainment of the auxiliary information can be optimally executed, the trace process of the auxiliary information can be executed more continuously.

<Configuration>

Figure 20:
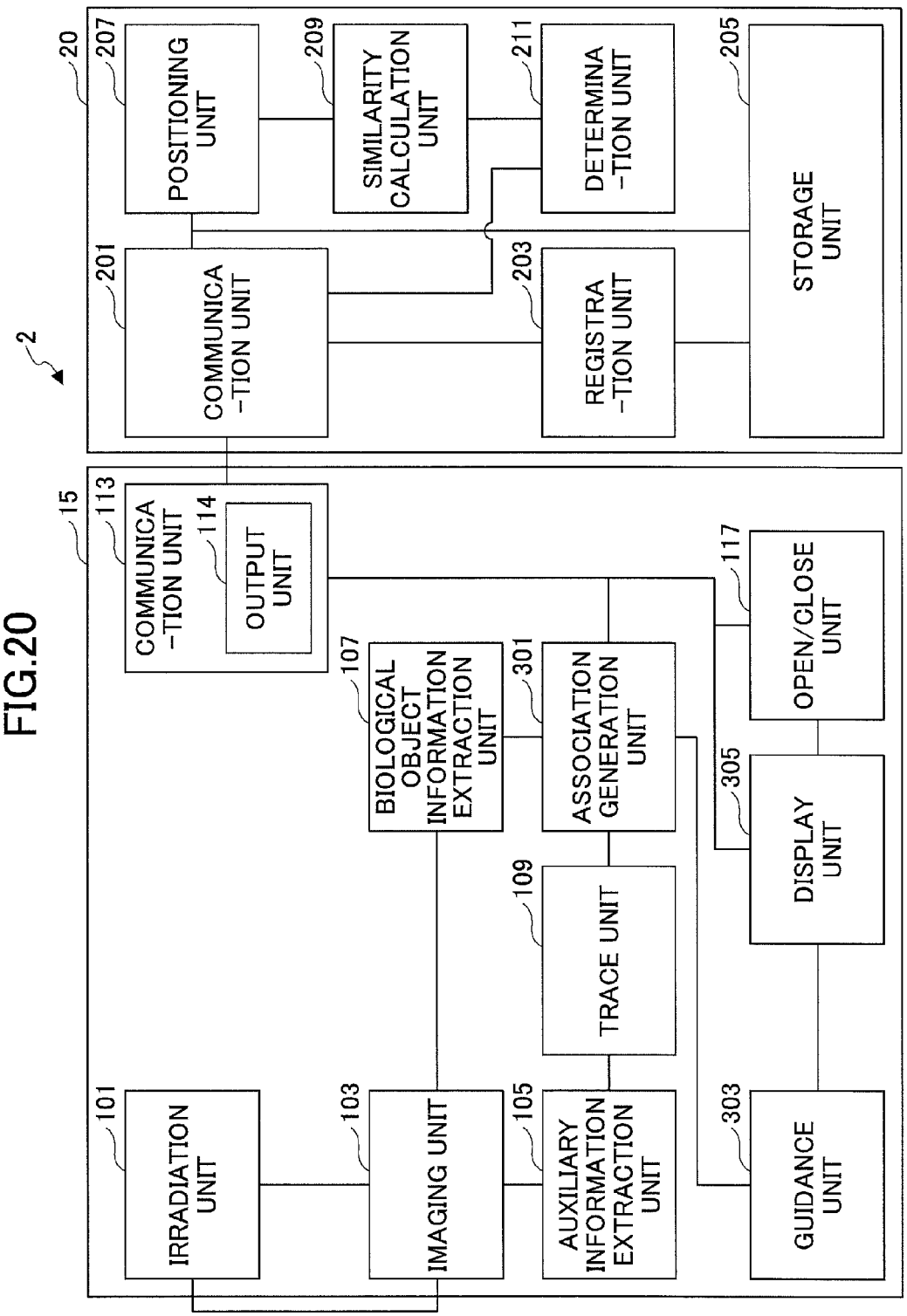
FIG. 20 is a block diagram illustrating an example of a configuration of an authentication system according to a second embodiment.

FIG. 20 is a block diagram illustrating an example of a configuration of the authentication system according to the second embodiment. In the configuration illustrated in FIG. 20, the same elements as in the authentication system 1 illustrated in FIG. 1 are assigned the same numeral codes. In the following, elements that differ from those in the first embodiment will be mainly described.

An association generation unit 301 of a biometric information processing apparatus 15 indicates the auxiliary information associated with the biometric information to a communication unit 113, and also indicates it to a guidance unit 303.

The guidance unit 303 predicts the position of the auxiliary information based on temporal change of the auxiliary information, and if the predicted auxiliary information is out of the imaging range, guides the user to a position contained in the imaging range. For example, the guidance unit 303 controls the display unit 305 to make a guidance by a voice, or to make a guidance or by an LED.

The display unit 305 displays a position where the user is supposed to hold a hand, by the voice or the LED following a command from the guidance unit 303. Next, main processes in the second embodiment will be described.

<<Guidance Unit>>

By tracing the auxiliary information, the guidance unit 303 can predict the auxiliary information that is kept contained in the imaging range and the auxiliary information that goes out of the imaging range. A guidance that forces the user to greatly change the movement is not convenient. Therefore, the guidance unit 303 basically guides the user in a direction within a certain range from the predicted move destination while the remaining auxiliary information can be kept as much as possible.

At this moment, it is preferable to execute the guidance by estimating which of the moving images has the biometric information that can be extracted. The following two methods may be considered.

A method that uses distance information

A method that does not use distance information

First, the method that uses distance information will be described. The distance information is obtained by a unit that measures the distance to a palm, which is provided separately from usual imaging. In general, one may consider a method that uses a distance measurement device other than a camera, or a method that calculates a distance from a captured result obtained with patterned light, which is projected by an irradiation device provided for the method. In the disclosed technology herein, the obtainment method of distance information may be either of these publicly known technologies.

An example of the estimation method that uses distance information will be described. A distance range with which the biometric information can be extracted is obtained beforehand by an evaluation experiment or the like. Here, a case is considered where the distance decreases while a hand is being held and moved.

(H1) Initialization

The guidance unit 303 sets the distance information obtained with the first imaging as the previous distance information. The previous distance information is denoted by d1.

(H2) Input of Distance Information

The guidance unit 303 inputs the distance information obtained when the current image is captured. The current distance information is denoted by d2.

(H3) Determination of Extraction Possibility

The guidance unit 303 estimates that the biometric information can be extracted from the previous and current images if the previous distance information and the current distance information are within a range where the biometric information can be captured. In this case, the guidance unit 303 does not execute a guidance to the user because the images have already been captured.

(H4) Distance Estimation

The guidance unit 303 estimates the distance for capturing the next image by, for example, d3=d2−(d1−d2). D3 is the distance information estimated for the next capturing.

(H5) Timing Estimation

If d3 is within the range in which the biometric information can be captured, the guidance unit 303 estimates that extraction can be made at the next capturing. If d3 is below the range in which the biometric information can be captured, it guides the user to decelerate the movement because the movement is too fast, and estimates that extraction can be made at the next capturing. If d3 is over the range in which the biometric information can be captured, it replaces the previous distance information with the current distance information, and executes to input the distance information again.

Next, a method that does not use the distance information will be described. In this case, the guidance unit 303 distinguishes a large hand away from the imaging unit and a small hand close to the imaging unit. As a clue usable for this distinction, for example, the brightness of the hand can be considered. By measuring the brightness of a typical hand for distances beforehand, the biometric information processing apparatus 10 makes a correspondence table between the brightness and distance. The guidance unit 303 can obtain the distance from the brightness of a captured image and the correspondence table. The rest of the process is the same as that using the distance information.

In the following, for the sake of simplicity, a process will be described when it is estimated that that extraction can be made at the next capturing. First, the guidance unit 303 estimates the position for each piece of the auxiliary information in an image to be captured next.

Estimation of the position is executed by, for example, applying linear extrapolation to the current and previous positions. Also, if the distance is usable, the guidance unit 303 estimates the next distance, assuming that the hand moves at constant speed with respect to the distance. Next, the guidance unit 303 may estimate the position of each pieces auxiliary information, assuming that the position from the center of the optical axis is inversely proportionate to the distance.

Figures 21, 22:
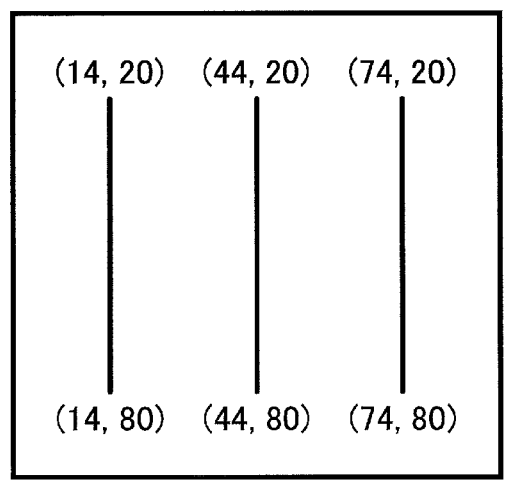
FIG. 21 is a diagram illustrating an example of estimated auxiliary information.
FIG. 22 is a diagram illustrating an example of biometric information after guidance.

For the extraction example illustrated in FIG. 7, an example will be described that estimates the position of the auxiliary information for the third image with the latter method. Assume that the capture distance for the first image is 15 cm, and the capture distance for the second image is 10 cm. Therefore, the capture distance for the third image is estimated as 5 cm. Therefore, since it is half of the capture distance for the second image, each piece of the auxiliary information is estimated to have the distance two times greater from the center of the optical axis. Thus, the estimated position of the auxiliary information for the third image is as illustrated in FIG. 21. FIG. 21 is a diagram illustrating the example of the estimated auxiliary information.

Next, the guidance unit 303 determines a direction for guidance. In the extraction example illustrated in FIG. 7, if no guidance is made, it is estimated that only two points are included in the imaging range as illustrated in FIG. 21. For example, for maximally increasing the number of points within a range up to six pixels, it may be moved leftward by six pixels on the screen.

Thereupon, the guidance unit 303 guides the user to move the palm a bit leftward on the screen. Note that, as a result of the guidance, it may go leftward too much, and degradation may occur. In such a case, the guidance unit 303 gives a direction to hold the hand again.

As the display unit 305 to indicate a direction of the guidance, a blink of an LED or a voice guidance may be considered. Assume that a guidance is made to move the palm a bit leftward on the screen in the extraction example illustrated in FIG. 7.

Figure 23:
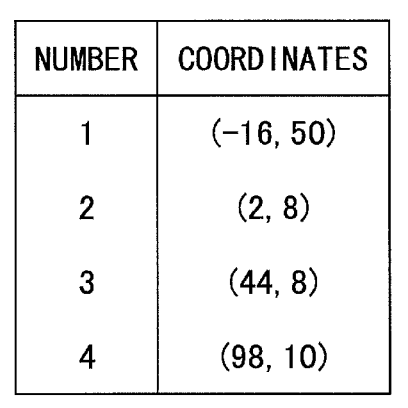

FIG. 22 is a diagram illustrating an example of the biometric information after the guidance. FIG. 23 is a diagram illustrating an example of the auxiliary information after the guidance. For example, FIG. 22 is obtained as the image of veins of the biometric information for the third image, and FIG. 23 is obtained as the auxiliary information.

<<Similarity Calculation and Determination Process>>

For the example of the biometric information after the guidance in FIG. 23 and the example of the registration data illustrated in FIG. 13, the similarity calculation unit 209 calculates the similarity for a case where the same similarity calculation method is used as in the first embodiment. The similarity calculation unit 209 obtains the next similarity.

$$165/183 \approx 0.902$$

It can be understood that the guidance unit 303 makes the positioning more precise, and the similarity improved. It is determined as the person in question if the threshold Th is set to 0.85 in the determination unit 211. Even if the threshold Th is raised to 0.90 to lower the false acceptance rate, it is also determined as the person in question.

\<Operations\>

Figure 24:
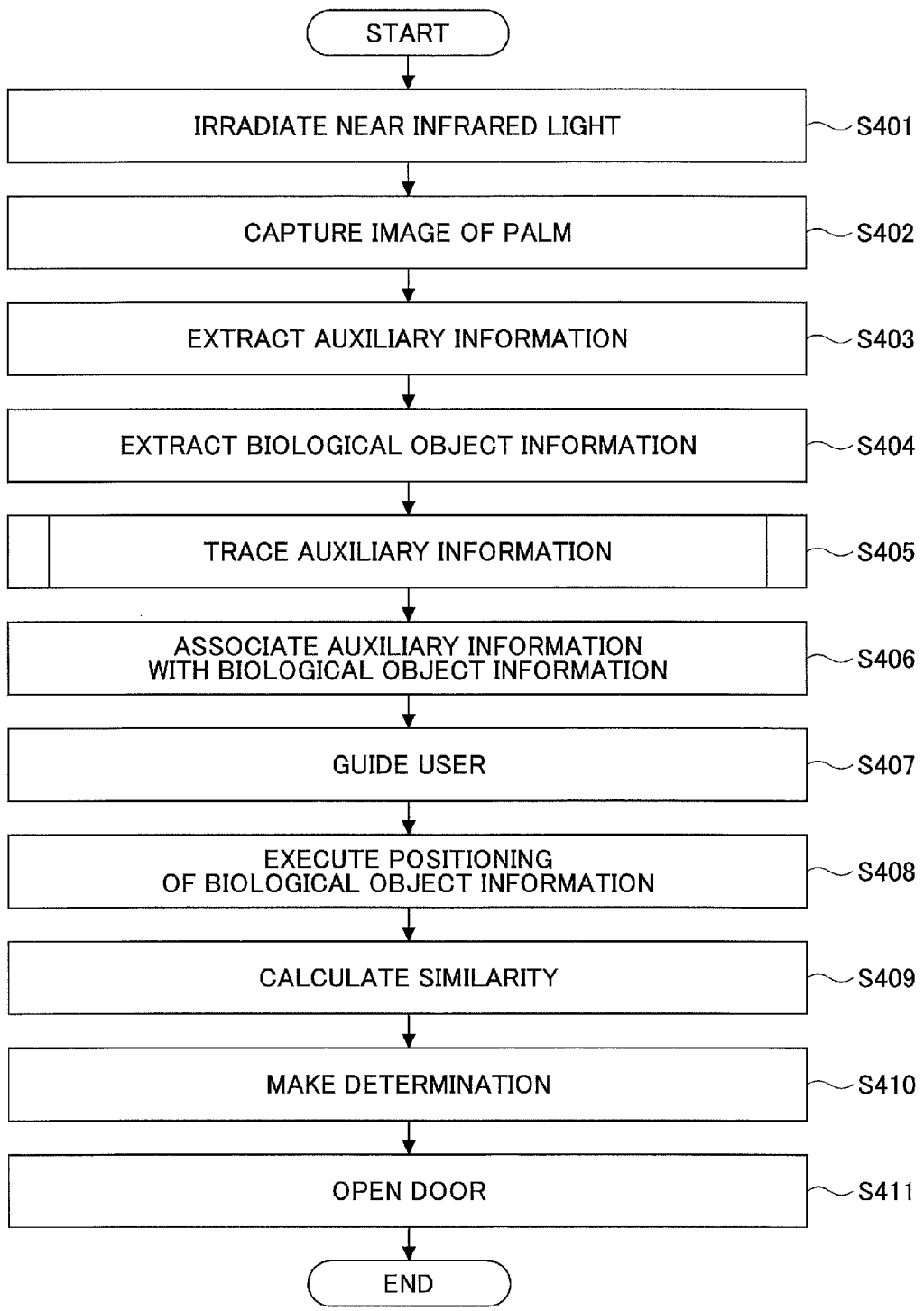
FIG. 24 is a flowchart illustrating an example of an authentication process according to the second embodiment.

Next, operations of the authentication system 2 will be described according to the second embodiment. FIG. 24 is a flowchart illustrating an example of an authentication process according to the second embodiment. Steps S401 to S406 illustrated in FIG. 24 are the same as Steps S101 to S106 in FIG. 17, and their description is omitted.

At Step S407, by tracing the auxiliary information, the guidance unit 303 predicts the auxiliary information to be kept contained in the imaging range and the auxiliary information to be out of the imaging range from now on. Based on the prediction, the guidance unit 303 executes a guidance to make the auxiliary information contained in the imaging range.

Steps S408 to S411 are the same as Steps S107 to S110 in FIG. 17.

Thus, according to the second embodiment, by guiding a user in a direction where obtainment of the auxiliary information can be optimally executed, the trace process of the auxiliary information can be executed more continuously. This makes authentication precision of biometric information improved even if auxiliary information is not included in the imaging range at an appropriate imaging position.

[Modified Example]

As a modified example of the above the embodiments, if the distance information is usable, the distance information is transferred to the biometric information extraction unit 107 so that the extraction process is executed only when the distance is within a range set beforehand. This lowers a risk in that the biometric information extraction unit 107 erroneously extracts pseudo biometric information from an inappropriate image.

The biometric information processing apparatus of the embodiments may include the authentication apparatus to execute the biometric authentication process. Also, the biometric information processing apparatus may be an ATM (Automatic teller machine), a PC (Personal Computer), or the like.

[Third Embodiment]

Next, an information processing apparatus will be described according to a third embodiment. In the third embodiment, the processes described in the first and second embodiments are executed by an information processing apparatus such as a PC or a server.

\<Configuration\>

Figure 25:
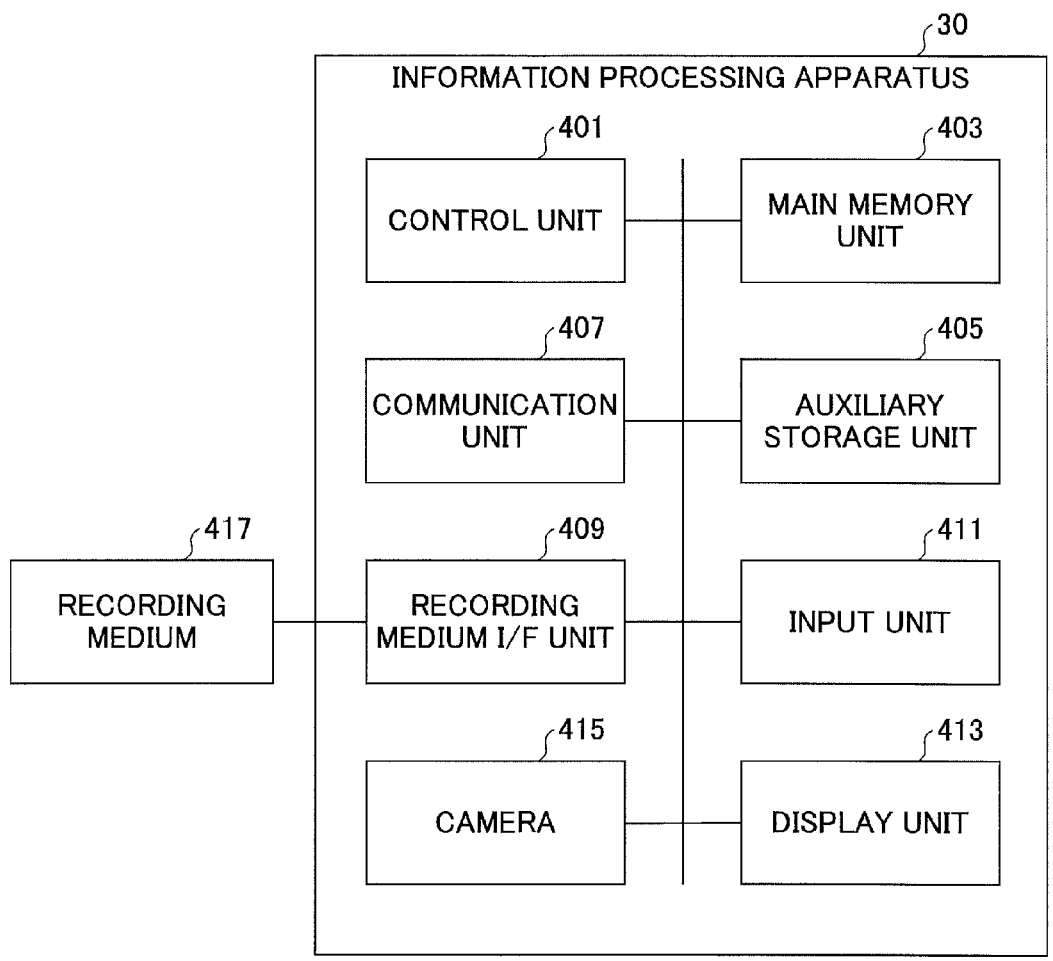
FIG. 25 is a block diagram illustrating an example of a configuration of an information processing apparatus according to the third embodiment.

FIG. 25 is a block diagram illustrating an example of a configuration of an information processing apparatus according to the third embodiment. The information processing apparatus 30 illustrated in FIG. 25 includes at least a control unit 401, a main memory unit 403, an auxiliary storage unit 405, a communication unit 407, a recording medium I/F unit 409, an input unit 411, a display unit 413, and a camera 415. These units are connected with each other via a bus to send/receive data.

The control unit 401 is a CPU in a computer for controlling devices and for calculating and processing data. The control unit 401 is also a processing unit for executing a program stored in the main memory unit 403 and the auxiliary storage unit 405, receives data from the communication unit 407 and the storage units, calculates and processes the data to output it to an output unit and the storage units.

Also, the control unit 401 can execute an output process of the biometric information and auxiliary information by executing a process program of the first or second embodiment stored in, for example, the auxiliary storage unit 405.

The main memory unit 403 includes a ROM (Read-Only Memory), a RAM (Random Access Memory), and the like, which is a memory device for storing or temporarily holding programs and data executed by the control unit 401 such as basic software, namely an OS, and application software.

The auxiliary storage unit 405 includes an HDD (Hard Disk Drive) and the like, which is a storage device for storing data relevant to the application software. Also, the auxiliary storage unit 405 may store the process program of the first or second embodiment obtained from a recording medium 417, and images obtained from the communication unit 407. The communication unit 407 executes communication via a wired or wireless network.

The recording medium I/F (interface) unit 409 is an interface between the recording medium 417 (for example, a flash memory) and the information processing apparatus 30 that are connected via a data transmission line such as a USB (Universal Serial Bus).

Also, the process program is stored in the recording medium 417, which is installed into the image processing apparatus 30 via the recording medium I/F unit 409. The installed process program can be executed by the information processing apparatus 30.

The input unit 411 includes a keyboard provided with cursor keys, keys for entering numerals and other functions, a mouse, a touchpad, and the like for selecting a key on the display screen on the display unit 413. The input unit 411 is also a user interface for a user to enter an operational command or data to the control unit 401.

The display unit 413 is, for example, an LCD (Liquid Crystal Display), on which data input from the control unit 401 is displayed.

The camera 415 is, for example, a CMOS camera or a CCD camera to capture a part of a body with moving images.

The storage units of the first and second embodiments may be implemented by, for example, the auxiliary storage unit 405. The imaging unit of the first and second embodiments may be implemented by, for example, the camera 415. The communication unit of the first and second embodiments, for example, may be implemented by the communication unit 407. Also, the other units of the first and second embodiments may be implemented by, for example, the control unit 301 and the main memory unit 303 as a working memory.

The program executed on the information processing apparatus 30 has a modular configuration that includes the units other than the storage units described in the first embodiment and the second embodiments. On actual hardware, by having the control unit 401 read and execute the program from the auxiliary storage unit 405, one or more of the units among the above units are loaded in the main memory unit 403, and one or more of the units are generated in the main memory unit 403.

Note that, by storing the program in a recording medium that implements the biometric information process described in the embodiments above, the biometric information process in the embodiments can be executed by a computer. For example, the program may be stored in the recording medium, the recording medium having the program stored may be read by a computer or a portable device to implement the biometric information process described earlier.

Note that various types of recording media can be used including a recording medium that records information optically, electrically, or magnetically such as a CD-ROM, a flexible disk, an optical magnetic disk and the like, and a semi-conductor memory and the like that records information electrically such as a ROM, a flash memory, and the like. Note that the recording media do not include a transmission wave.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A biometric information processing apparatus comprising:
   a processor; and
   a memory,
   wherein the processor is configured to:
   extract auxiliary information representing a part of a body being captured together with biometric information from a plurality of images captured by an imaging unit;
   trace the auxiliary information in a time direction;
   extract the biometric information from at least one image among the plurality of images;
   associate the traced auxiliary information with the extracted biometric information in terms of a positional relationship;
   output the auxiliary information having been associated with the biometric information;
   predict a position of the auxiliary information based on temporal change of the auxiliary information; and
   guide a user to place the auxiliary information within an imaging range if the predicted position of the auxiliary information is out of the imaging range.

2. The biometric information processing apparatus as claimed in claim 1, wherein when tracing the auxiliary information, the auxiliary information positioned out of the imaging range is replaced by an estimated value using a model of the temporal change of the auxiliary information.

3. The biometric information processing apparatus as claimed in claim 1, wherein the biometric information is biometric information extracted from a hand, and the auxiliary information is information of a profile of a hand or information of bases of fingers.

4. The biometric information processing apparatus as claimed in claim 2, wherein when tracing the auxiliary information, the tracing is executed with first auxiliary information extracted from an image to be traced and second auxiliary information extracted from an image preceding the image to be traced, and the model is changed depending on the number of pieces of the auxiliary information with which correspondences are obtained.

5. A biometric information processing method executed by a computer, the method comprising:
   extracting auxiliary information representing a part of a body being captured together with biometric information from a plurality of images captured by an imaging unit;
   tracing the auxiliary information in a time direction;
   extracting the biometric information from at least one image among the plurality of images;
   associating the traced auxiliary information with the extracted biometric information in terms of a positional relationship;
   outputting the auxiliary information having been associated with the biometric information;
   predicting a position of the auxiliary information based on temporal change of the auxiliary information; and
   guiding user to place the auxiliary information within an imaging range if the predicted position of the auxiliary information is out of the imaging range.

6. A non-transitory computer-readable recording medium having a program stored therein for causing a computer to execute a process, the process comprising:
   extracting auxiliary information representing a part of a body being captured together with biometric information from a plurality of images captured by an imaging unit;
   tracing the auxiliary information in a time direction;
   extracting the biometric information from at least one image among the plurality of images;
   associating the traced auxiliary information with the extracted biometric information in terms of a positional relationship;
   outputting the auxiliary information having been associated with the biometric information;
   predicting a position of the auxiliary information based on temporal change of the auxiliary information; and
   guiding a user to place the auxiliary information within an imaging range if the predicted position of the auxiliary information is out of the imaging range.

* * * * *